Sept. 6, 1966        E. LOOS        3,270,367

NO BOUNCE CASTER ASSEMBLY

Filed Oct. 18, 1965        2 Sheets-Sheet 1

Inventor
Edward Loos
By Cushman, Darby & Cushman
Attorneys

United States Patent Office 3,270,367
Patented Sept. 6, 1966

3,270,367
NO BOUNCE CASTER ASSEMBLY
Edward Loos, 503 E. 19th Ave., Vancouver,
British Columbia 10, Canada
Filed Oct. 18, 1965, Ser. No. 497,434
4 Claims. (Cl. 16—19)

This is a continuation-in-part of application Serial Number 226,253, filed September 26, 1962, now abandoned, entitled, No Bounce Caster Assembly.

This invention relates to casters and more particular to casters used on heavy machinery such as snow removal equipment, farm implements or large industrial sweepers.

Casters of the type used on furniture or hand trucks have been constructed incorporating shock absorbing compression springs. However, such casters are not suitable for supporting heavy implements such as for example, snow plows, in accurate relation to a surface to be plowed. A snow plow for use on highways, generally weighs several thousand pounds and may be operated at speeds of up to thirty miles per hour. The useful life of known casters is relatively short when subjected to such operating conditions.

Due to the short life of known casters snow plows are supported by heavy metal shoes which wear rapidly as they skid on a paved or gravel surface. In addition the blade of the plow wears rapidly and generally must be replaced when the shoes are replaced. The cost of metal used up in this way together with labor costs and the cost of the extra plows required, due to the substantial amount of time required for maintenance, is considerable.

An object of the present invention is the provision of a caster that is capable of supporting large implements which are operated at high speeds.

Another object is the provision of a caster wheel with a pair of coaxial bushings which rotate on a fixed axis. The axle and bushings can be replaced as they wear out and excessive wear of the flanges supporting the wheel is thereby avoided.

Another object is the provision of a caster which will absorb shocks due to the operation of the implement it supports on uneven ground.

Another object is the provision of a caster which resists the tendency to bounce when operating on uneven ground.

Other objects include the provision of means for adjusting the height of the caster thereby raising or lowering the implement which it supports.

Another object of the present invention is the provision of cooperating inner and outer cylinders, the inner cylinder being capable of rotation to serve as a very rugged king pin to distribute lateral forces.

A still further object of the present invention is the provision of means to prevent excessive swiveling of the caster.

By one aspect of the present invention there is provided a caster comprising a flanged plate, a wheel journalled for rotation between the flanges of said plate, an inner cylinder extending vertically upwardly from said plate and secured thereto, an outer cylinder one end of which is fitted over said inner cylinder, the other end of which is closed, a centrally located aperture in said closed end, an axially extending rod extending through said aperture to said plate and secured thereto, means on the end of said rod extending through said aperture adjacent the exterior surface of said cylinder to limit axial movement of said outer cylinder away from said inner cylinder, and resilient means in said inner cylinder bearing against said plate and said closed end of said outer cylinder to urge said outer cylinder away from said plate.

In the drawing which illustrates an embodiment of the invention:

Figure 1:
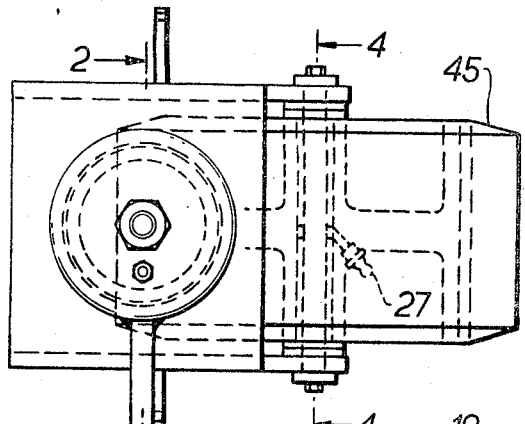
FIG. 1 is a top plan view of a caster of FIG. 2.
Figure 2:
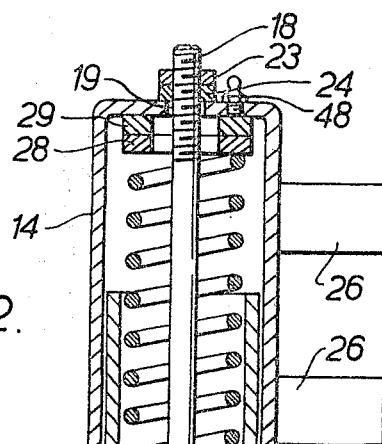
FIG. 2 is a vertical sectional view along the line 2—2 of FIG. 1 of a caster in accordance with the invention.
Figure 3:
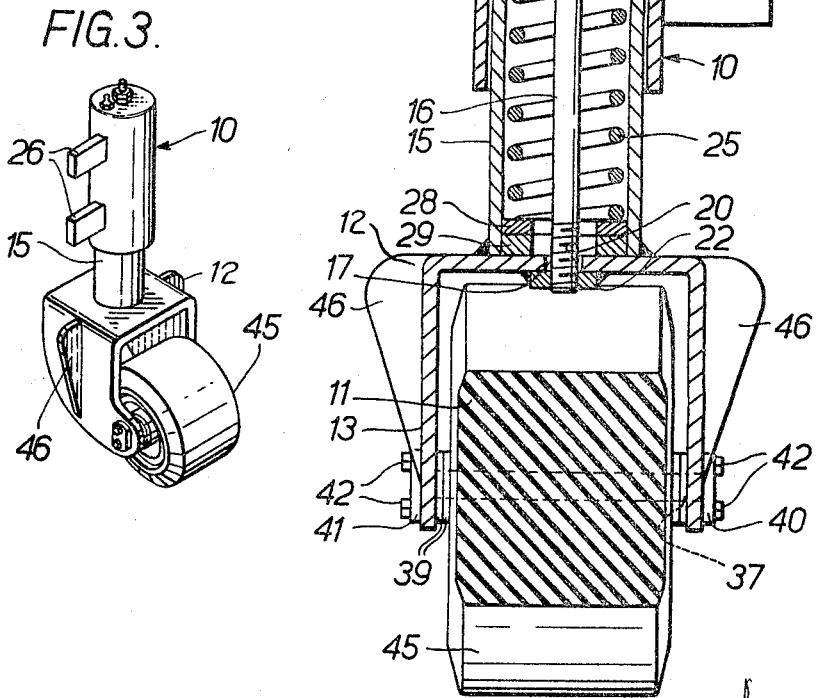
FIG. 3 is a perspective of the caster of FIG. 1.

As shown in FIG. 2 of the drawing a caster indicated generally at 10 includes a wheel 11 journalled on flanges 13 of a flanged plate 12.

Figure 4:
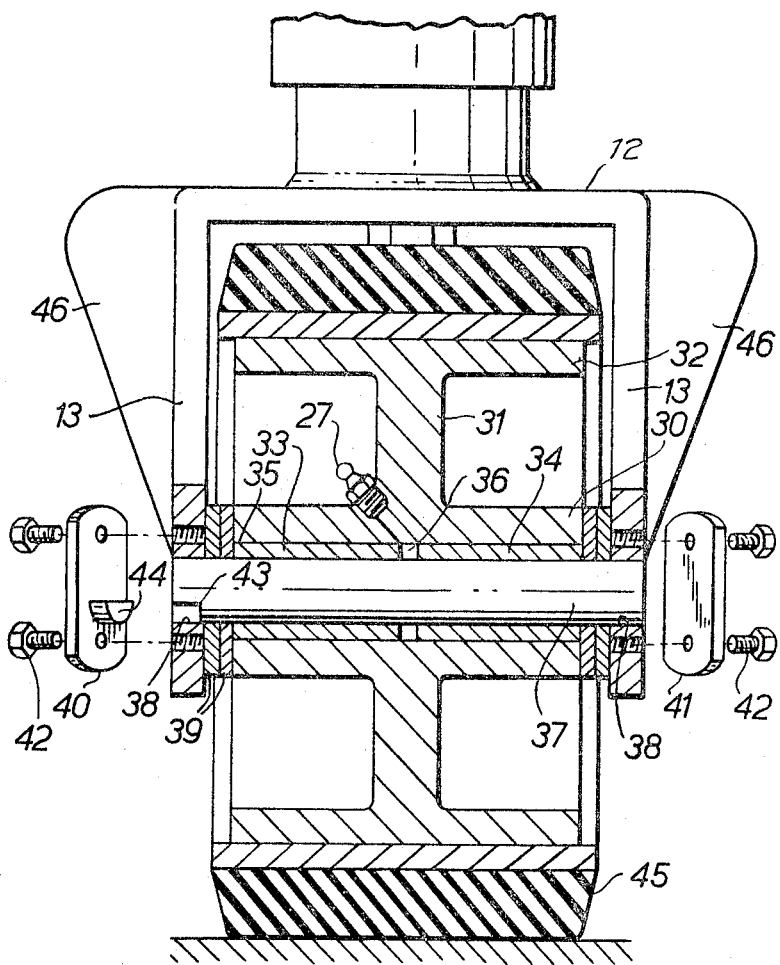
FIG. 4 is a vertical sectional view along the line 4—4 of FIG. 1 including an exploded view of the axle retaining plates.

The wheel 11 shown in FIG. 4 comprises a hub 30 integrally joined by a spacer element 31 to a rim 32. The wheel 11 is cast in one piece however other methods of fabrication may be employed. This shape of the wheel 11 is such as to provide a large cooling surface. Two coaxial bushings 33 and 34 are provided in the axial bore 35 of the wheel 11. The lengths of the bushings 33 and 34 are such that an annular groove 36 is formed which constitutes a lubricant reservoir. The annular groove 36 is in communication with a grease nipple 27 on the wheel hub 30. An axle 37 is provided in the axial bores of bushings 33 and 34 which are adapted to rotate about the axle 37. The axle 37 extends through apertures 38 in each of the flanges 13, and also through spacers 39 provided between the hub and the flanges 13.

Axle retaining plates 40 and 41 are removably secured to flanges 13 by bolts 42 threadedly engaged by suitable holes (not shown) in flanges 13. One end of the axle 37 is provided with a key way 43 to cooperate with a key 44 provided on the left hand retaining plate 40, thereby preventing rotation of the axle 37.

The wheel 10 is also provided with a rubber tire 45.

It will be apparent that the axle 37 can be easily removed or replaced by removing the retaining plates 40 and 41.

It is preferable to use ground shaft stock as an axle, as replacement of the axle 37 is then a matter of cutting the required length of shaft stock and forming the key way 43 with readily available tools.

The provision of a stationary axle 37 is advantageous in that wear takes place along the length of the axle 37 and bushings 33 and 34, rather than at the apertures 38 of the flanges 13 or at the retaining plates 40 and 41.

The provision of bronze bushings 33 and 34 rather than roller bearings is an important feature of the instant invention as roller bearings tend to show unsatisfactory wear characteristics if required to support heavy loads of up to 4000 pounds while rotating at speeds of up to 1800 r.p.m. i.e. 60 miles per hour.

It is also important to provide the lubricant reservoir to prevent rapid wearing of the bushings 33 and 34. Without the annular groove 36 to provide a reservoir of lubricant it would not be possible to operate continuously for long periods at high speeds without replenishing the lubricant.

The caster 10 is provided with an inner cyliner 15 adapted to fit snugly in, slide and rotate in an outer cylinder 14. The outer cylinder 14 is closed at its upper end. The inner cylinder 15 is secured at its lower end by welding or other suitable means to the flanged plate 12. An axial extending rod 16 extends through an aperture 17 in the plate 12, which is centrally located with respect to inner cylinder 15 and is secured to the plate 12 by a lock nut 22 welded to the plate 12 and engaging a threaded portion 20 of the rod 16.

A threaded portion 18 of the upper end of the rod 16 extends through the centrally located aperture 19 in the outer sleeve 14. The threaded portion 18 is provided with adjustment nuts 23 and 24.

A helical compression spring 25 in the inner cylinder 15 bears against bronze washers or apertured discs 29 adjacent the flanged plate 12 and the closed end of the outer cylinder 14, urging the plate 12 away from the outer cylinder 14. If desired a steel washer 28 may be provided between the spring 25 and the bronze washer 29.

The outer cylinder 14 is provided with attaching brackets 26 welded or otherwise suitably secured thereto. Reinforcing ribs 46 may be provided on the flanges 13 of the flanged plate 12. A grease nipple 48 is secured to the closed end of outer cylinder 14 to lubricate the bronze washers 29. If desired, a similar grease fitting may be provided adjacent the lower end of the outer cylinder 14, to lubricate mating portions of cylinders 14 and 15.

In operation the caster 10 is attached to an implement such as a snow plow by means of the attaching brackets 26. The compression spring 25 is sufficiently stiff to support the weight of the implement and little if any compression of the spring 25 occurs at this stage.

If it is desirable to lower the implement, the adjustment nuts 23 and 24 are tightened down so as to bear against the outer cylinder 14 thereby compressing the spring and lowering the implement. It is understood that the length of the spring 25 and the position of the adjustment nuts 23 and 24 serve as a means for raising as well as lowering an implement supported by a caster constructed in accordance with this invention.

The compression spring 25 also serves another function, that of absorbing shock due to operation of the implement on rough or uneven ground. In this capacity the axial rod 16 and the adjustment nuts 23 and 24 limit the upward movement of the outer cylinder 14 and the attached implement thus curbing the tendency of the implement to bounce.

The inner cylinder 15 is adapted to rotate in the outer cylinder 14 thus enabling the caster wheel 11 to rotate through 360°. The inner and outer cylinders thus serve as a king pin which is capable of withstanding severe lateral forces.

The bronze washers 29 are adapted to rotate on the flanged plate 12 and the closed outer end of the cylinder 14. Due to the weight of the implement acting thereon washers 29 serve as disc brakes to prevent excessive swiveling of the caster 10 during high speed operation. It is also possible to increase the load on the washers 29 by tightening the adjustment nuts 23 and 24.

It will be appreciated that controlling the swiveling action of the caster 10 is very important as excessive swiveling at high speeds limits the useful life of the tire and wheel assembly.

The embodiments of the invention in which an exclusive property or privilege is claimed are defined as follows.

I claim:
1. A caster adapted to support a heavy implement and to remain in rolling contact with a surface when supporting said implement, said caster comprising:
   (a) a flanged plate having an upper surface and a lower surface;
   (b) a wheel journalled for rotation between the flanges of said plate;
   (c) an inner cylinder extending vertically upwardly from the upper surface of said plate and secured thereto;
   (d) an outer cylinder having an upper end and a lower end telescoped over said inner cylinder, the lower end of said outer cylinder being adapted to be in end abutting relationship to said upper surface of said plate, said plate having a dimension greater than the diameter of said outer cylinder, said outer cylinder being normally urged away from said plate so that the lower end of said outer cylinder is spaced vertically from said upper surface of said flanged plate;
   (e) a partially closed upper end on said outer cylinder defining a centrally located aperture;
   (f) an axially extending rod secured to said plate and extending upwardly therefrom through said aperture;
   (g) means cooperating with an end of said rod extending through said aperture to limit axial movement of said outer cylinder with respect to said inner cylinder;
   (h) a compression spring in said inner cylinder bearing against said plate and said partially closed end of said outer cylinder to urged said outer cylinder away from said plate; and
   (i) means on said outer cylinder to secure said outer cylinder to said implement.

2. A caster adapted to support a heavy implement and to remain in rolling contact with a surface when supporting said implement, said caster comprising:
   (a) a flanged plate having an upper surface and a lower surface;
   (b) a wheel provided with a pair of spaced apart coaxial bushing;
   (c) an axle extending through said flanges and said bushings rotatably to mount said wheel between said flanges;
   (d) means releasably secured to one of said flanges to prevent rotation of said axle;
   (e) a lubricant reservoir defined by said spaced apart bushings;
   (f) an inner cylinder extending vertically upwardly from the upper surface of said plate and secured thereto;
   (g) an outer cylinder having an upper end and a lower end telescoped over said inner cylinder, the lower end of said outer cylinder being adapted to be in end abutting relationship to said upper surface of said plate; said plate having a dimension greater than the diameter of said outer cylinder; said outer cylinder being normally urged away from said upper surface of said flanged plate;
   (h) a partially closed upper end on said outer cylinder defining a centrally located aperture;
   (i) an axially extending rod secured to said plate and extending upwardly therefrom through said aperture;
   (j) means cooperating with an end of said rod extending through said aperture to limit axial movement of said outer cylinder with respect to said inner cylinder;
   (k) a compression spring in said inner cylinder bearing against said plate and said partially closed end of said outer cylinder to urge said outer cylinder away from said plate; and,
   (l) means on said outer cylinder to secure said outer cylinder to said implement.

3. A caster adapted to support a heavy implement and to remain in rolling contact with a surface when supporting said implement, said caster comprising:
   (a) a flanged plate having an upper surface and a lower surface;
   (b) a wheel journalled for rotation between the flanges of said plate;
   (c) an inner cylinder extending vertically upwardly from the upper surface of said plate and secured thereto;
   (d) an outer cylinder having an upper end and a lower end telescoped over said inner cylinder, the lower end of said outer cylinder being adapted to be in end abutting relationship to said upper surface of said plate, said plate having a dimension greater than the diameter of said outer cylinder, said outer cylinder being normally urged away from said plate so that the lower end of said outer cylinder is spaced vertically from said upper surface of said flanged plate;
   (e) a partially closed upper end on said outer cylinder defining a centrally located aperture;
   (f) an axially extending rod secured to said plate and extending upwardly therefrom through said aperture;
   (g) means cooperating with an end of said rod extending through said aperture to limit axial movement of said outer cylinder with respect to said inner cylinder;
(h) a compression spring in said inner cylinder bearing against said plate and said partially closed end of said outer cylinder to urge said outer cylinder away from said plate;
(i) means on said outer cylinder to secure said outer cylinder to said implement; and,
(j) a pair of apertured discs one of which is disposed between said compression spring and said partially closed end of said outer cylinder, the other of said discs being disposed between said compression spring and said plate.

4. A caster adapted to support a heavy implement and to remain in rolling contact with a surface when supporting said implement, said caster comprising:
(a) a flanged plate having an upper surface and a lower surface;
(b) a wheel provided with a pair of spaced apart coaxial bushings;
(c) an axle extending through said flanges and said bushings rotatably to mount said wheel between said flanges;
(d) means releasably secured to one of said flanges to prevent rotation of said axle;
(e) a lubricant reservoir defined by said spaced apart bushings;
(f) an inner cylinder extending vertically upwardly from the upper surface of said plate and secured thereto;
(g) an outer cylinder having an upper end and a lower end telescoped over said inner cylinder, the lower end of said outer cylinder being adapted to be in end abutting relationship to said upper surface of said plate; said plate having a dimension greater than the diameter of said outer cylinder; said outer cylinder being normally urged away from said upper surface of said flanged plate;
(h) a partially closed upper end on said outer cylinder defining a centrally located aperture;
(i) an axially extending rod secured to said plate and extending upwardly therefrom through said aperture;
(j) means cooperating with an end of said rod extending through said aperture to limit axial movement of said outer cylinder with respect to said inner cylinder;
(k) a compression spring in said inner cylinder bearing against said plate and said partially closed end of said outer cylinder to urge said outer cylinder away from said plate;
(l) means on said outer cylinder to secure said outer cylinder to said implement; and,
(m) a pair of aperture bronze discs one of which is disposed between said compression spring and said partially closed end of said outer cylinder, the other of said discs being disposed between said compression spring and said plate.

References Cited by the Examiner
UNITED STATES PATENTS

| | | | |
|---|---|---|---|
| 1,749,751 | 3/1930 | Bergsten | 16—44 |
| 2,272,270 | 2/1942 | Krotz | 16—44 |
| 2,377,232 | 5/1945 | Herold | 16—44 |
| 2,534,575 | 12/1950 | Conley et al. | 16—19 |
| 2,914,364 | 11/1959 | Ross | 16—36 |

EDWARD C. ALLEN, *Primary Examiner.*

D. L. TROUTMAN, *Assistant Examiner.*